United States Patent [19]
Cantrell et al.

[11] Patent Number: 5,305,687
[45] Date of Patent: Apr. 26, 1994

[54] POPCORN BALL FORMING APPARATUS

[76] Inventors: Jesse D. Cantrell; Hilda J. Cantrell, both of 136 Rifle Gap, Universal City, Tex. 78148

[21] Appl. No.: 48,310

[22] Filed: Apr. 19, 1993

[51] Int. Cl.[5] ............................................. A23P 1/10
[52] U.S. Cl. ................................. 99/440; 99/426; 249/170; 220/4.22; 220/4.25
[58] Field of Search ............... 99/426, 440, 353; 220/4.22, 4.23, 4.24, 4.25; 249/170; 425/442

[56] References Cited

U.S. PATENT DOCUMENTS

| | | | |
|---|---|---|---|
| 1,243,128 | 10/1917 | Baker | 249/170 |
| 1,838,702 | 12/1931 | Partridge | 220/4.22 |
| 2,745,642 | 5/1956 | Hermann | 220/4.25 |
| 4,244,470 | 1/1981 | Burnham | 220/4.25 |
| 4,532,722 | 8/1985 | Sax | 220/4.22 |
| 4,652,456 | 3/1987 | Sailsbury | 426/307 |

FOREIGN PATENT DOCUMENTS

| | | | |
|---|---|---|---|
| 0315419 | 10/1919 | Fed. Rep. of Germany | 99/440 |
| 0167891 | 8/1950 | Fed. Rep. of Germany | 99/440 |
| 0533727 | 5/1958 | Fed. Rep. of Germany | 249/170 |
| 0694779 | 10/1957 | United Kingdom | 220/422 |

*Primary Examiner*—Harvey C. Hornsby
*Assistant Examiner*—Reginold L. Alexander
*Attorney, Agent, or Firm*—Leon Gilden

[57] ABSTRACT

First and second semi-spherical molds are arranged for securement relative to one another in a mirror image relationship to receive and mold a popcorn ball workpiece therewithin. The first and second semi-spherical molds include respective first and second handle members that are arranged in a radially oriented relationship relative to the first and second molds and are diametrically aligned when the first and second molds are secured together.

3 Claims, 4 Drawing Sheets

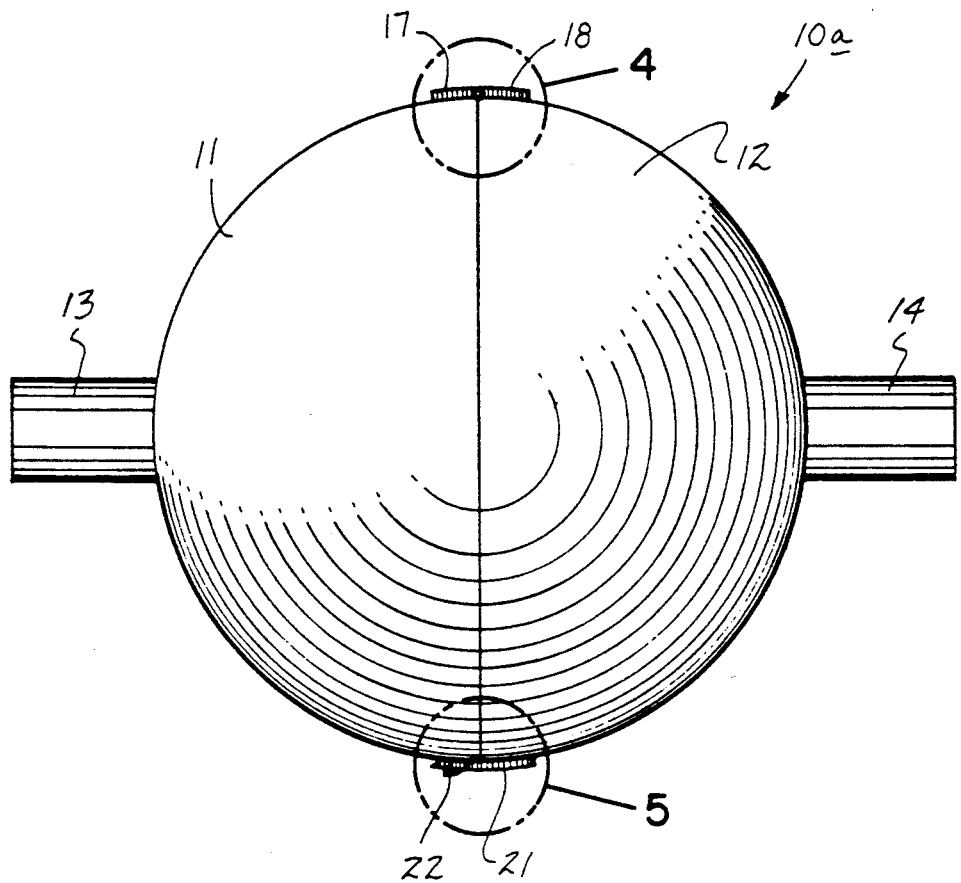
FIG. 3
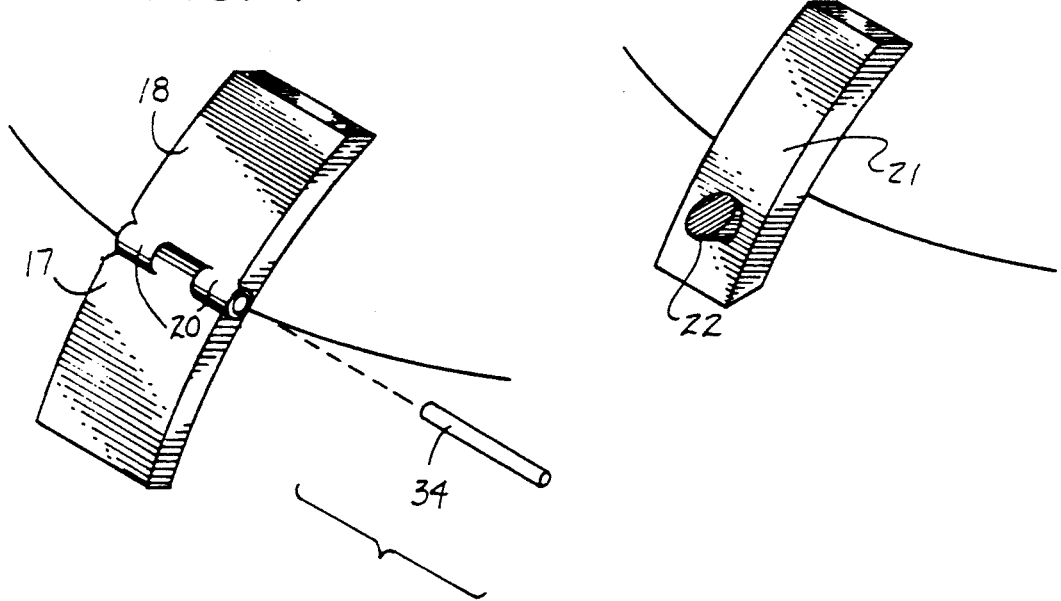
FIG. 4
FIG. 5

POPCORN BALL FORMING APPARATUS

BACKGROUND OF THE INVENTION

1. Field of the Invention

The field of invention relates to coated popcorn forming structure, and more particularly pertains to a new and improved popcorn ball forming apparatus wherein the same is directed to the formation of popcorn balls.

2. Description of the Prior Art

Prior art U.S. Pat. Nos. 4,849,233; 3,843,814; and 4,927,645, as well as the U.S. Pat. No. 4,652,456, are arranged to indicate manners of preparing coated popcorn, each patent of which is incorporated herein by reference. U.S. Pat. No. 4,759,937 sets forth structure for molding popcorn utilizing various shapes.

The instant invention attempts to overcome deficiencies of the prior art by employing cooperating mold members, each having a handle arranged to secure the molds about a popcorn mass to be formed in a spherical configuration and in this respect, the present invention substantially fulfills this need.

SUMMARY OF THE INVENTION

In view of the foregoing disadvantages inherent in the known types of popcorn coating structure now present in the prior art, the present invention provides a popcorn ball forming apparatus wherein the same is arranged to direct coated popcorn within the apparatus to create a spherical member. As such, the general purpose of the present invention, which will be described subsequently in greater detail, is to provide a new and improved popcorn ball forming apparatus which has all the advantages of the prior art popcorn molding structure and none of the disadvantages.

To attain this, the present invention provides first and second semi-spherical molds arranged for securement relative to one another in a mirror image relationship to receive and mold a popcorn ball workpiece therewithin. The first and second semi-spherical molds include respective first and second handle members that are arranged in a radially oriented relationship relative to the first and second molds and are diametrically aligned when the first and second molds are secured together.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved popcorn ball forming apparatus which has all the advantages of the prior art popcorn molding structure and none of the disadvantages.

It is another object of the present invention to provide a new and improved popcorn ball forming apparatus which may be easily and efficiently manufactured and marketed.

It is a further object of the present invention to provide a new and improved popcorn ball forming apparatus which is of a durable and reliable construction.

An even further object of the present invention is to provide a new and improved popcorn ball forming apparatus which is susceptible of a low cost of manufacture with regard to both materials and labor, and which accordingly is then susceptible of low prices of sale to the consuming public, thereby making such popcorn ball forming apparatus economically available to the buying public.

Still yet another object of the present invention is to provide a new and improved popcorn ball forming apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic view of the invention indicating latch structure for securing the first and second spherical molds together.

FIG. 4 is an isometric illustration of a hinge structure employed by the invention.

FIG. 5 is an isometric illustration of the latch structure employed by the invention.

DESCRIPTION OF THE PREFERRED EMBODIMENT

Figure 1:
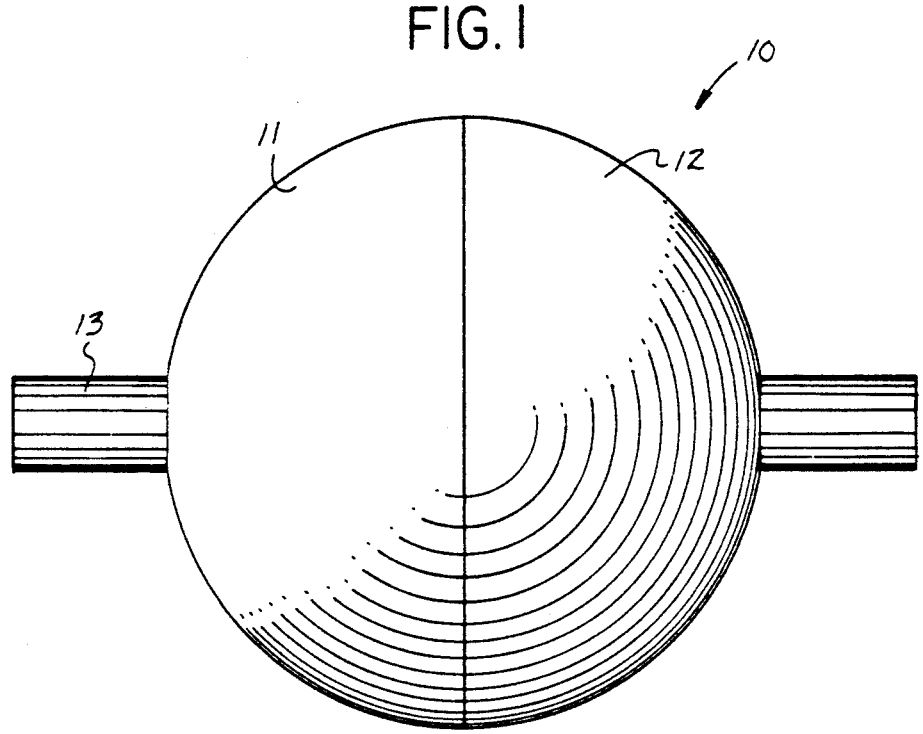
FIG. 1 is an orthographic view of the invention.
Figure 2:
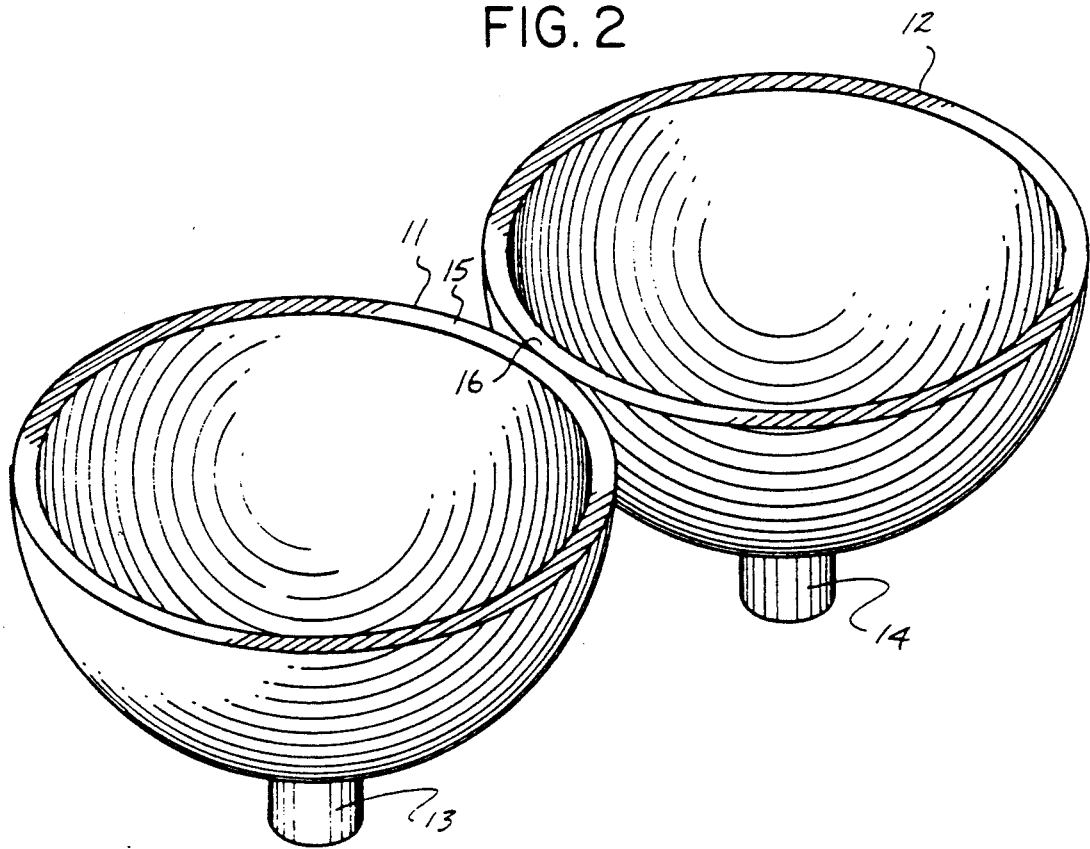
FIG. 2 is an isometric illustration of the invention in a separated configuration.

With reference now to the drawings, and in particular to FIGS. 1 to 9 thereof, a new and improved popcorn ball forming apparatus embodying the principles and concepts of the present invention and generally designated by the reference numerals 10 and 10a will be described.

Figure 6:
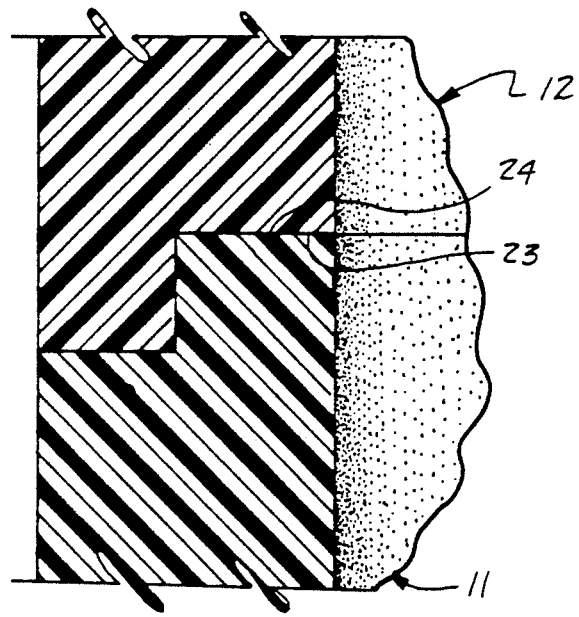
FIG. 6 is an enlarged cross-sectional illustration of modified facing annular walls for use by the invention to effect enhanced sealing of the popcorn within the mold members.

More specifically, the popcorn ball forming apparatus 10 of the instant invention essentially comprises first and second semi-spherical mold members 11 and 12 arranged in a mirror image relationship relative to one another for securement relative to one another, as indicated in FIG. 1, having respective first and second handle members 13 and 14 arranged fixedly and radially relative to and in a medial orientation to the respective first and second molds 11 and 12, wherein the first and second handles 13 and 14 are arranged in a diametrical relationship, as indicated in FIG. 1, wherein the first and second molds are in an assembled configuration. Typically, popcorn is precoated and then scooped or positioned within the first and second molds for final curing into a spherical shape, wherein the interior surface of the molds may be coated with flour and the like, or alternatively may include a TEFLON liner, as indicated in FIG. 6, within the respective interior surfaces of the first and second mold members 11 and 12.

The first and second mold members utilize respective first and second mold planar annular entrance walls 15 and 16, each orthogonally oriented relative to the respective first and second handles 13 and 14 for facing relationship relative to one another, wherein alternatively, the first mold member 11 may employ a first stepped annular entrance wall 24 for complementary securement to a second stepped entrance wall 23 of the second mold 12 to enhance and align the molds in a spherical configuration, such as indicated in FIG. 1.

Furthermore to permit securement of the molds together, first and second hinge plates 17 and 18 are arranged for mounting to the respective first and second molds in adjacency to the entrance walls, with the first hinge plate having a first hinge plate loop 19 received between second hinge plate loops 20 such that a hinge pin 34 is placed in the respective first and second loops 19 and 20 for securement of the first and second molds in a hinged relationship relative to one another, with a spring-biased latch plate 21 mounted to the second mold 12 receiving a locking lug 22 therethrough, with the hinge plate locking lug arranged in diametrically opposed orientation relative to the first and second hinge plates 17 and 18.

Figure 7:
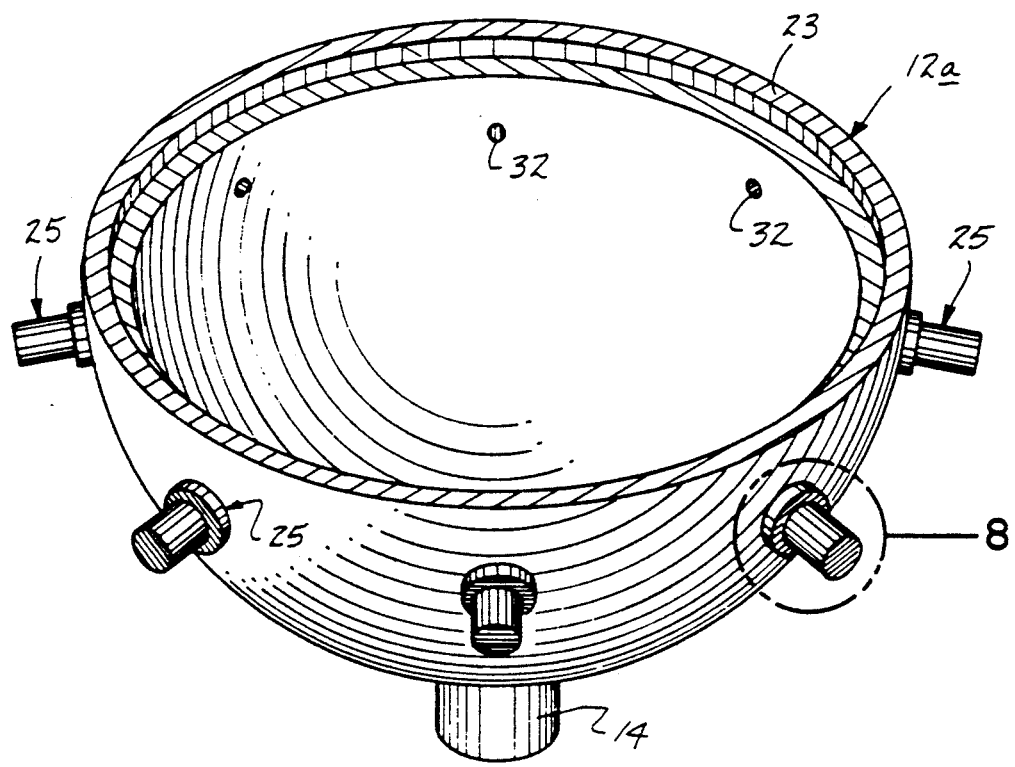
FIG. 7 is an isometric illustration of a modified mold structure.
Figure 8:
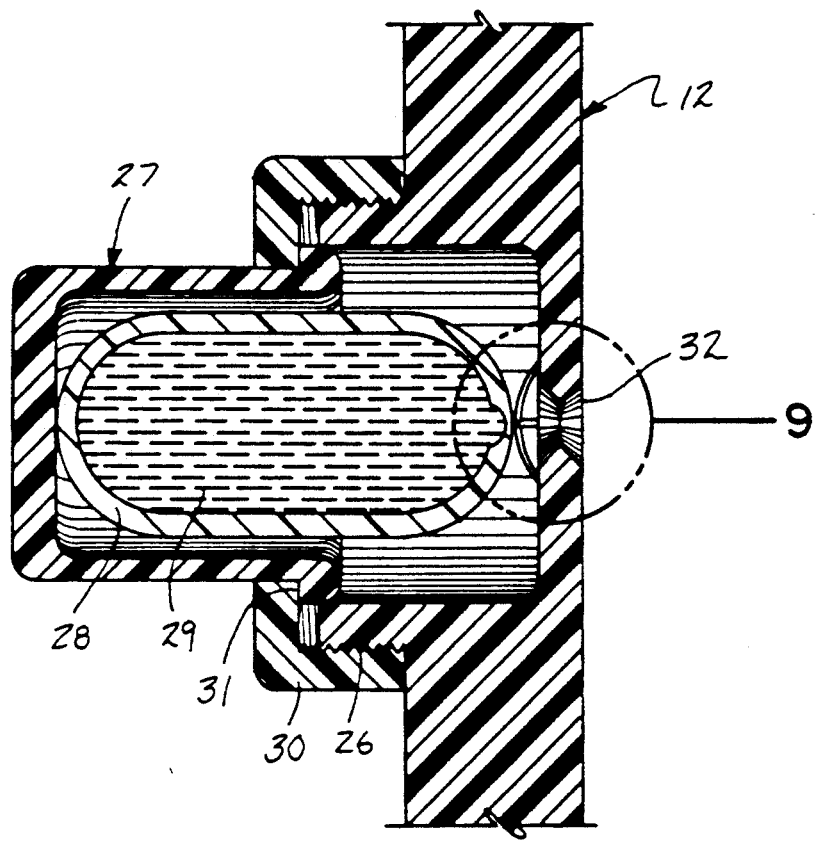
FIG. 8 is an enlarged orthographic view of section 8, as set forth in FIG. 7 taken in cross-section.
Figure 9:
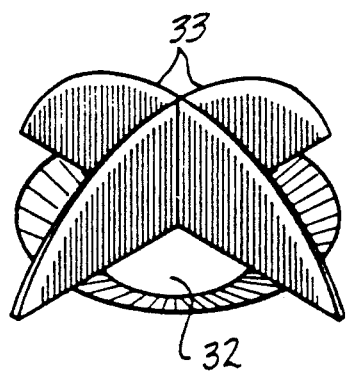
FIG. 9 is an enlarged isometric illustration of section 9, as set forth in FIG. 8.

The FIG. 7 indicates the use of a modified second mold structure 12a, having an annular array of flavor injector housings 25 mounted in adjacency to the second stepped entrance wall 23. Each of the injector housings 25 includes a threaded boss 26 fixedly mounted to an exterior surface of the second mold 12 to receive a flexible resilient injector housing 27 medially of and coaxially aligned relative to the threaded boss 26 received through a threaded boss in alignment with an associated injector port 32 of an annular array of injector ports, as indicated in FIG. 7, with an individual injector port 32 arranged for communication interiorly of the mold and the resilient injector housing 27. The injector housing component 27 is arranged to receive a resilient capsule 28 therewithin, having a fluid 29, such as flavoring, coloring, and the like, received therewithin. A locking collar 30 threadedly mounted to the threaded boss 26 engages an injector housing annular flange 31 of the injector housing component 27 to coaxially align the capsule 28 with a respective injector port 32. The injector port 32 includes arcuate intersecting cutter blades 33 positioned over the injector port 32 to sever the capsule 28 at the injector port, whereupon manual compression of the resilient injector housing component 27 expresses the fluid 29 through the injector port into the popcorn component (not shown) within the second mold 12.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A popcorn ball forming apparatus, comprising, a first semi-spherical mold arranged for securement to a second semi-spherical mold, wherein the first semi-spherical mold includes a first handle fixedly mounted medially of and radially aligned relative to the first semi-spherical mold, and a second handle mounted medially and fixedly in a radial orientation relative to the second semi-spherical mold permitting securement and positioning of the first semi-spherical mold in a mirror image relationship relative to the second semi-spherical mold, and the first semi-spherical mold includes a first stepped annular entrance wall, with the second mold having a second complementarily stepped entrance wall received within the first stepped annular entrance wall, and the first mold includes a first hinge plate, the second mold includes a second hinge plate, wherein the first hinge plate is mounted in adjacency to the first entrance wall, having a first hinge plate loop, and the second hinge plate positioned in adjacency relative to the second entrance wall includes a plurality of second hinge plate loops, and a hinge pin is arranged for slidable reception through the first hinge plate loop and the second hinge plate loop to hingedly secure the first mold to the second mold, and a spring-biased latch plate mounted to the second mold in adjacency to the second entrance wall, with the latch plate mounted in a diametrically oriented relationship relative to the second hinge plate, and a locking lug fixedly mounted to the first mold in a diametrically opposed orientation relative to the first hinge plate arranged for reception through the latch plate, and an annular array of flavor injector housing members mounted to the second mold in adjacency to the second entrance wall, wherein each of the injector housings include a threaded boss, each threaded boss coaxially aligned relative to an injector port directed through the second mold, and an injector housing component received medially of and coaxially aligned through the threaded boss for fluid communication with the port to direct fluid through the port.

2. An apparatus as set forth in claim 1 wherein the injector housing component includes a resilient capsule contained therewithin, having a fluid within said capsule, and the injector housing component including an annular flange, with a locking collar threadedly mounted to the threaded boss engaging the annular flange to secure the injector housing opponent within the threaded boss.

3. An apparatus as set forth in claim 2 wherein the injector port includes a plurality of arcuate intersecting blades extending over the injector boss in a confronting relationship relative to and between the injector port and the capsule to effect severing of the capsule permitting directing of the fluid of said capsule through the port.

* * * * *